United States Patent
Carlsson et al.

(10) Patent No.: US 11,345,274 B2
(45) Date of Patent: May 31, 2022

(54) ENDCAP LIGHTS

(71) Applicant: Modul-System HH AB, Molndal (SE)

(72) Inventors: Anders Carlsson, Hisings Backa (SE); David Hodge, Bracknell (GB)

(73) Assignee: MODUL-SYSTEM HH AB, Molndal (SE)

(*) Notice: Subject to any disclaimer, the term of this patent is extended or adjusted under 35 U.S.C. 154(b) by 0 days.

(21) Appl. No.: 17/179,055

(22) Filed: Feb. 18, 2021

(65) Prior Publication Data

US 2021/0253022 A1 Aug. 19, 2021

(30) Foreign Application Priority Data

Feb. 19, 2020 (EP) .................................... 20158302

(51) Int. Cl.
*B60Q 1/26* (2006.01)
*B60Q 1/24* (2006.01)
*B60R 9/045* (2006.01)
*B60R 9/04* (2006.01)

(52) U.S. Cl.
CPC .............. *B60Q 1/2611* (2013.01); *B60Q 1/24* (2013.01); *B60R 9/04* (2013.01); *B60R 9/045* (2013.01)

(58) Field of Classification Search
CPC ...... B60Q 1/2611; B60Q 1/24; B60Q 1/0483; B60R 9/045; B60R 9/04
USPC ................................................. 362/484, 493
See application file for complete search history.

(56) References Cited

U.S. PATENT DOCUMENTS

| | | | |
|---|---|---|---|
| 4,426,028 A | 1/1984 | Bott | |
| 6,114,954 A * | 9/2000 | Palett | B60R 9/00 340/475 |
| 7,419,286 B2 * | 9/2008 | Stein | B60Q 1/2611 224/329 |
| 8,550,674 B2 * | 10/2013 | Yu | B60Q 1/2611 362/493 |
| 9,758,088 B1 | 9/2017 | Salter et al. | |
| 9,937,868 B2 * | 4/2018 | McClintock | B60R 9/04 |
| 2010/0110708 A1 * | 5/2010 | Lyons | B60Q 1/2611 362/493 |
| 2012/0031939 A1 | 2/2012 | Jutila et al. | |

(Continued)

FOREIGN PATENT DOCUMENTS

DE 102015116701 A1 4/2016
DE 202016007703 U1 1/2017
(Continued)

OTHER PUBLICATIONS

Search Report from parent application EP Application No. 20158302.8, dated Jul. 10, 2020.

*Primary Examiner* — Laura K Tso
(74) *Attorney, Agent, or Firm* — Harness, Dickey & Pierce, P.L.C.

(57) ABSTRACT

The present inventive concept relates to roof bar endcap for a vehicle, said endcap comprising one or more light emitting devices, an envelope arranged to at least partially surround said one or more light emitting devices, said envelope comprising one or more light exit surface portions, wherein said one or more light emitting devices is arranged to emit light through said one or more light exit surfaces, an engagement part adapted to engage a distal end of a roof bar such that the endcap is fixedly attached to said roof bar.

12 Claims, 6 Drawing Sheets

(56) References Cited

U.S. PATENT DOCUMENTS

2018/0172239 A1 6/2018 Wacker et al.
2019/0176717 A1* 6/2019 Gomes .................. B62D 25/06

FOREIGN PATENT DOCUMENTS

DE 202017102636 U1 8/2017
WO WO-2014186659 A1 11/2014

* cited by examiner

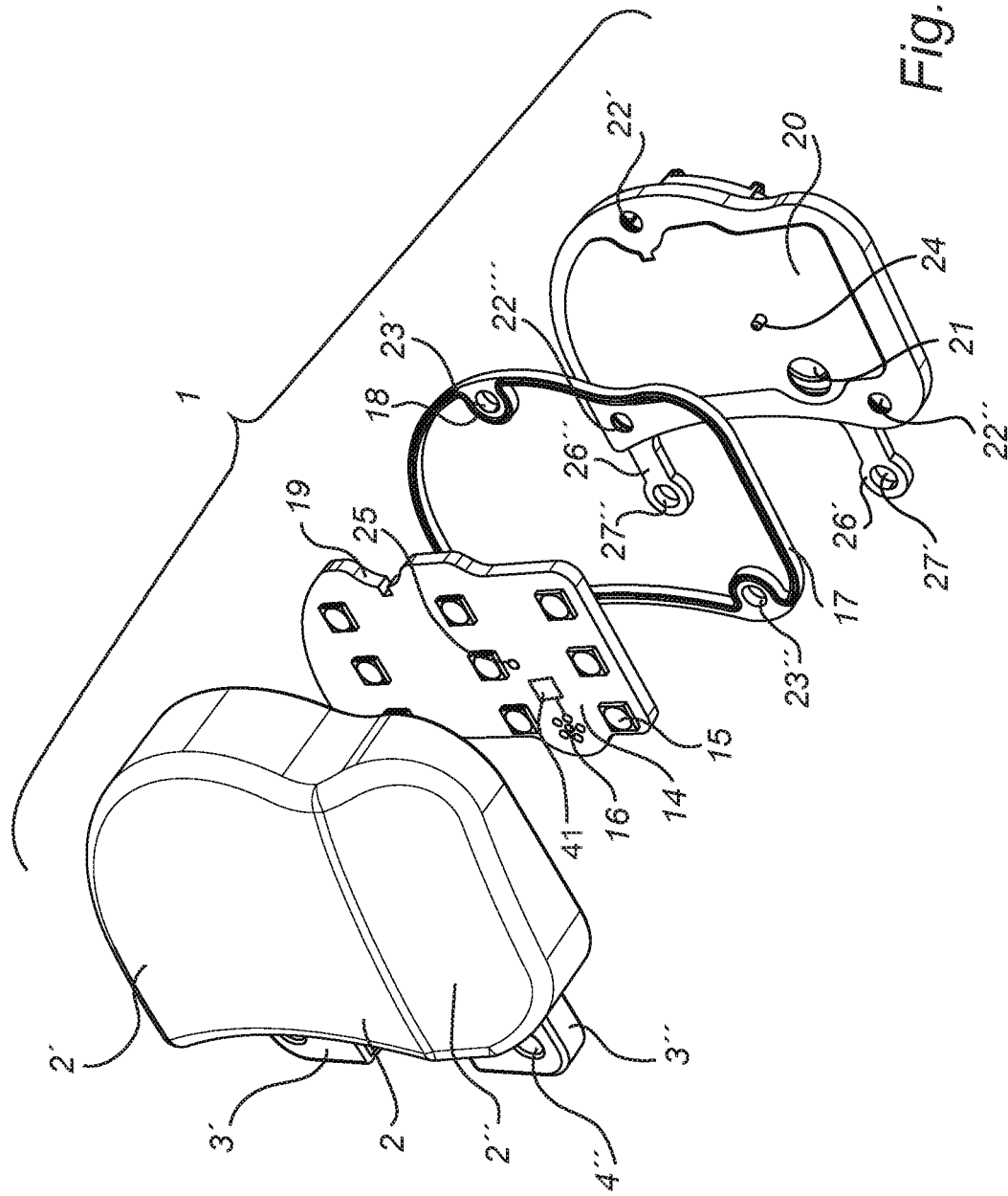

ENDCAP LIGHTS

CROSS-REFERENCE TO RELATED APPLICATIONS

This application claims the benefit and priority of EPC Application No. 20158302.8, filed on Feb. 19, 2020. The entire disclosures of the above applications are incorporated herein by reference.

FIELD

The present inventive concept relates to an endcap with integrated lighting adapted to be attached to roof bar of a vehicle, and a roof bar comprising such an endcap.

BACKGROUND

When working with the aid of light commercial vehicles (LCVs), there is often a lot of separate equipment involved, e.g. when working by the roadside, such as clearing thicket or repairing power poles. If the work is performed during conditions with low lighting, such as during night, it is not only difficult to carry out said work, but also to locate said equipment. In order to remedy this, extra lighting while working can be provided.

In the prior art, there exists lighting solutions for vehicles where the vehicle is outfitted with extra lighting. Some solutions are aimed at providing lighting on the roof of the vehicle, such as in a roof rack mounted thereon. However, such solutions often relate to, e.g., providing better visibility for the driver when driving the vehicle, or to be able to detect the vehicle amongst other vehicles in a parking lot. An example of such solutions is to mount a light source directly on the roof bar. Some problems with this are that the air drag for the vehicle increases and electrical cords supplying the light source with power needs to be accommodated for. Another solution is to provide the roof bar with grooves, or similar structures, that can receive a light source. However, that requires machining of the roof bar or that it is fabricated accordingly, increasing cost and/or time consumption.

There is in light of the above a need for a new lighting solution for a roof bar of a vehicle.

SUMMARY

An object of the present inventive concept is therefore to alleviate at least some of the aforementioned problems with the current state of the art.

According to a first aspect of the present inventive concept, a roof bar endcap for a vehicle is provided, said endcap comprising: one or more light emitting devices, an envelope arranged to at least partially surround said one or more light emitting devices, said envelope comprising one or more light exit surface portions, wherein said one or more light emitting devices is arranged to emit light through said one or more light exit surfaces, and an engagement part adapted to engage a distal end of a roof bar such that the endcap is fixedly attached to said roof bar.

Light exit surface portion of the envelope of the endcap is to be understood as a transmissive portion of the envelope permitting passage of light, such as light originating from a light emitting source of the endcap.

By providing a lighting solution in the endcap of a roof bar, the vehicle is readily provided with extra lighting functionality without any need for machining the roof bar, the roof or any other part of the vehicle. Furthermore, the roof bar does not require any structural alterations prior to being mounted on the vehicle in order to accommodate the lighting solution. As an example, a given roof bar of any type or brand can be made to accommodate an endcap according to the present inventive concept by modifying an endcap already present in said roof bar, or by fabricating an endcap that fits the dimensions thereof. Therefore, a more cost-efficient and material-efficient endcap is provided. Moreover, by having a lighting solution integrated into an already existing detail of the roof bar, i.e. an endcap of the roof bar, the addition of such lighting functionality does not increase the total drag of the vehicle.

According to at least one exemplary embodiment, the endcap further comprises means for receiving an external signal, said means being arranged to convert an external signal into a controller input signal, and a controller arranged to receive said controller input signal and convert said controller input signal into an electrical control signal for controlling said one or more light emitting devices.

An external signal can be any signal originating from outside of the endcap. Preferably, the external signal is an electromagnetic signal or an electrical signal. For example, the external signal may be a radiofrequency (RF) signal, such as a Bluetooth signal. The external signal may also be an electrical signal. The external signal may originate from a variety of sources. For example, the external signal may originate from events within a system of the vehicle, such as a button being pressed, a door being opened, a timer being triggered or expiring etc.

By providing the endcap with means to receive an external signal, the functionality that is provided by the endcap, i.e. provided by the one or more light emitting device, can easily be controlled by, e.g., a user of the vehicle from outside the endcap.

According to at least one exemplary embodiment, the endcap further comprises an energy storage unit adapted to provide power to said one or more light emitting devices.

The energy storage unit may e.g. be the only source of power for the one or more light emitting devices.

By providing such an energy storage unit, there is no need for an external power source for the endcap. E.g., there is no need for a power line between the endcap and the vehicle.

The energy storage unit may be a rechargeable energy storage unit.

According to at least one exemplary embodiment, the endcap further comprised a connector for electrically and mechanically connect to a power grid, such as a power grid of a vehicle.

By providing a connection between the power grid of a vehicle and the endcap, the endcap may be provided power from the vehicle.

According to at least one exemplary embodiment, said external signal is an electrical signal, such as an electrical signal originating from said vehicle.

According to at least one exemplary embodiment, said one or more light emitting devices comprises at least two modes of lighting.

Two modes of lighting are to be understood as two distinct distributions of light. Two modes can differ in e.g. colour, geometrical distribution and intensity.

An endcap comprising different modes of lighting, a more functional and compact lighting solution is provided.

According to at least one exemplary embodiment said one or more light emitting devices in a first of said at least two modes of lighting is arranged to emit light in a first plane and said one or more light emitting devices in a second of said at least two modes of lighting is arranged to emit light in a second plane, and wherein said first plane is deviant to said second plane.

Plane is to be understood as a geometrical plane. The geometrical plane a light emitting device emits light in is to be understood as a plane comprising a central axis or symmetry axis or similar of the emitted light, such as a symmetry axis of an emitted cone of light.

By providing light in two distinct planes, the two modes of lighting may correspond to different lighting purposes. For example, one mode of lighting may be a strobe lighting whereas the other mode of lighting is a work illumination lighting, i.e. lighting with the purpose of providing illumination when working in proximity to the vehicle.

The first plane may e.g. be substantially perpendicular to the second plane.

According to at least one exemplary embodiment, said one or more light exit surface portions comprises a first and a second light exit surface portion, wherein said one or more light emitting devices in said first mode is arranged to emit light through said first light exit surface portion, and wherein said one or more light emitting devices in said second mode is arranged to emit light through said second light exit surface portion.

According to at least one exemplary embodiment, said first light exit surface portion is arranged at an angle in relation to said second light exit surface portion.

By providing the light exit surface portions at an angle in relation to each other, the distributions of light corresponding to the two modes of lighting are readily different.

According to at least one exemplary embodiment, said one or more light emitting devices comprises two light emitting devices, wherein a first light emitting device comprises said first mode and a second light emitting device comprises said second mode, and wherein said first light emitting device is arranged to emit light through said first light exit surface portion and said second light emitting device is arranged to emit light through said second light exit surface portion.

By having one light emitting device comprising the first mode and another light emitting device comprising the second mode, the modes can be operated independently. Thus, a more adaptable and functional device is provided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3A is an exploded perspective view of an endcap according to the present inventive concept.

DETAILED DESCRIPTION

Example embodiments will now be described more fully with reference to the accompanying drawings.

In the following detailed description, some embodiments of the present inventive concept will be described. It is however to be understood that, unless anything else is specifically indicated, features of the different embodiments are exchangeable between the embodiments and may be combined in different ways. Even though in the following description, numerous specific details are set forth to provide a more thorough understanding of the present inventive concept, it will be apparent to one skilled in the art that the present inventive concept may be practiced without these specific details. In other instances, well known constructions or functions are not described in detail, so as not to obscure the present inventive concept.

Figure 1:
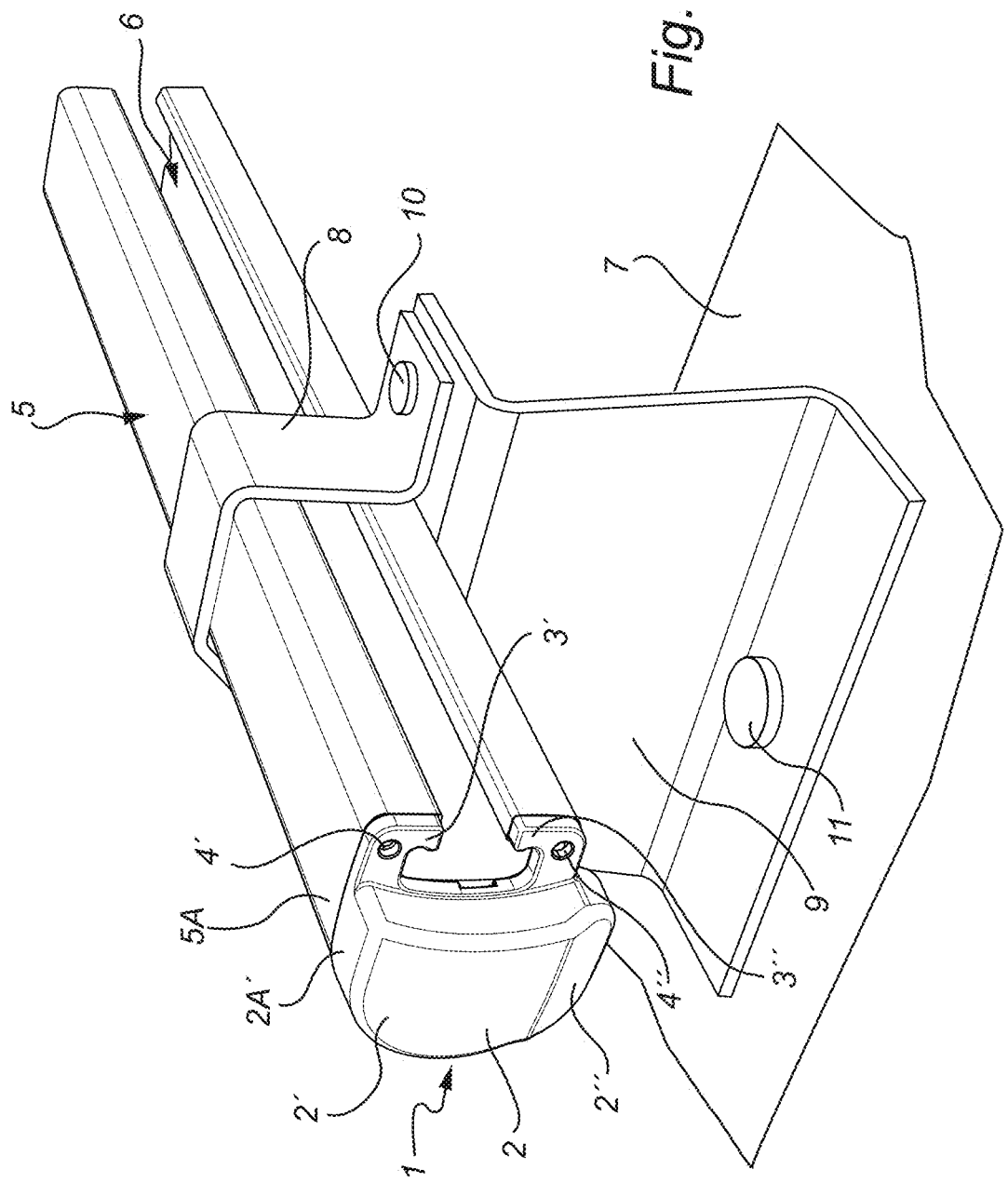
FIG. 1 is a perspective view of a roof bar endcap according to the present inventive concept when in use, mounted on a distal end of a roof bar.

FIG. 1 shows a perspective view of a roof bar endcap 1 comprising a light transmissive envelope 2. The envelope 2 may be made of any type of transmissive, preferably durable, material such as plastic or plexiglass. The envelope 2 comprises a first light exit surface portion 2' and a second light exit surface portion 2", and a first and a second fastening portion 3',3" comprising a respective through-hole 4',4" arranged to receive fastening means, such as a nail, a screw or a plug, so that the envelope 2 is fastened to a roof bar 5. The endcap 1 further comprises a first connecting surface 2A' arranged proximal to the roof bar 5, and especially to an upper surface 5A of the roof bar 5. The endcap 1 is arranged such that the first connecting surface 2A' is arranged substantially flush with the upper surface 5A of the roof bar 5. In FIG. 1, both the connecting surface 2A' and the upper surface 5A are substantially horizontal in relation to the ground on which the vehicle they are mounted upon is standing, why they together form a substantially flush, continuous horizontal surface when brought together, i.e. when the endcap 1 is in use and fastened to the roof bar 5. The endcap 1 is mounted on a distal end 5A of the roof bar 5. The roof bar 5 may be made of any type of hard, durable material, such as metal. Here, a roof bar comprising a slit 6 is shown, the slit 6 being adapted to receive and hold equipment that is to be used in conjunction with utilization of the vehicle. The roof bar 5 is further adapted to be arranged on a roof 7 of the vehicle. The roof bar 5 is connected to the roof 7 by a first clip 8 and a second clip 9, e.g. a first and a second metal clip. The first clip 8 is fastened to the second clip 9 by a screw 10, and the second clip 9 is, in turn, fastened to the roof 7 by a screw 11. The screws 10 and 11 may be any other form of connecting and fastening device, such as a nail or a plug.

Figure 2A:
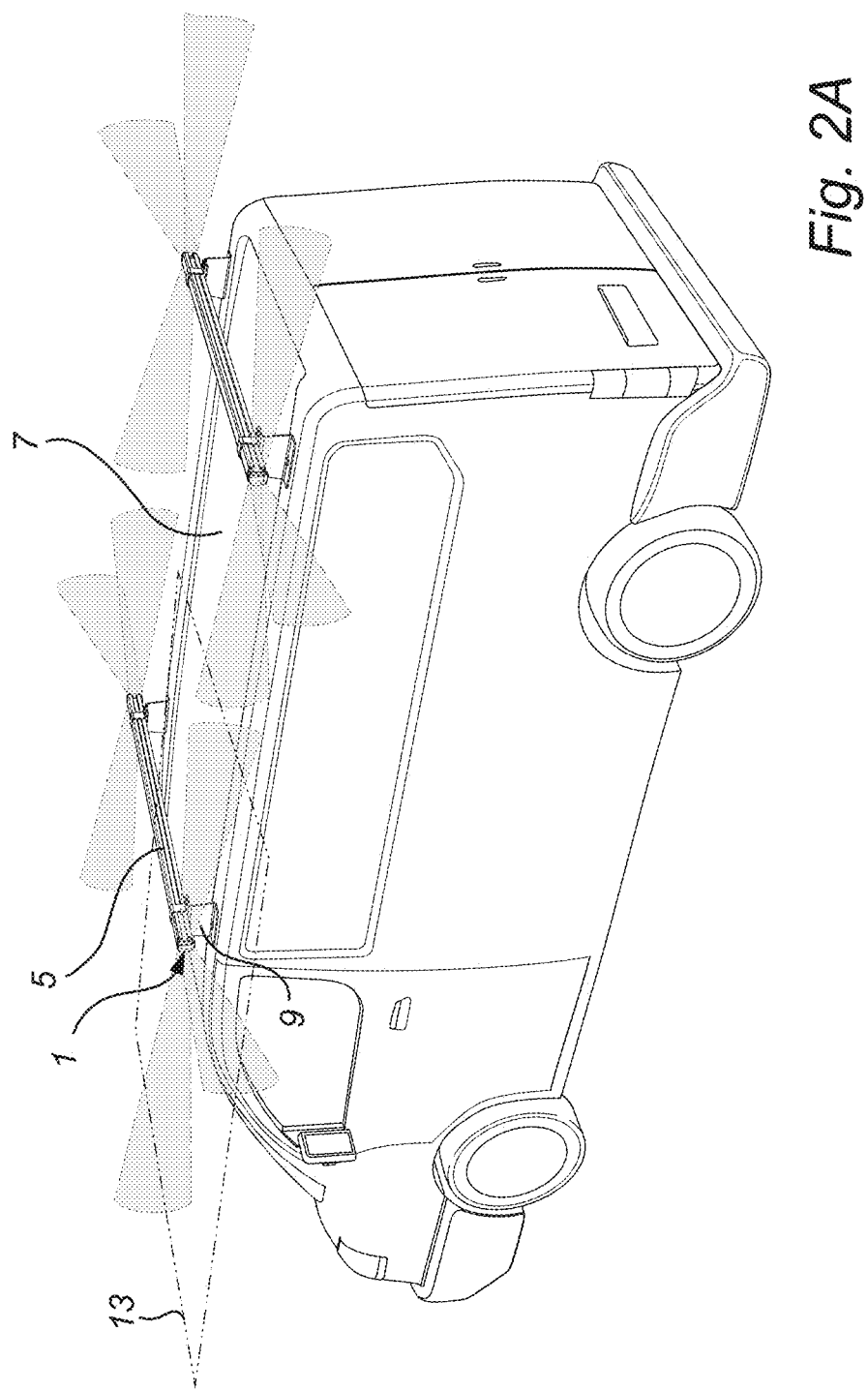
FIG. 2A is a perspective view of the roof bar with the roof bar endcap shown in FIG. 1 when mounted on a vehicle. Here, the endcap is emitting light in a first plane, according to a first mode of lighting.

FIG. 2A shows the endcap in a first mode of lighting where it is emitting light substantially in a first geometrical plane 13. The first plane 13 is substantially horizontal and therefore substantially parallel with the roof 7. The first mode of lighting may e.g. be strobe lighting indicating the position of the vehicle to other vehicles or persons travelling in the vicinity of the vehicle.

Figure 2B:
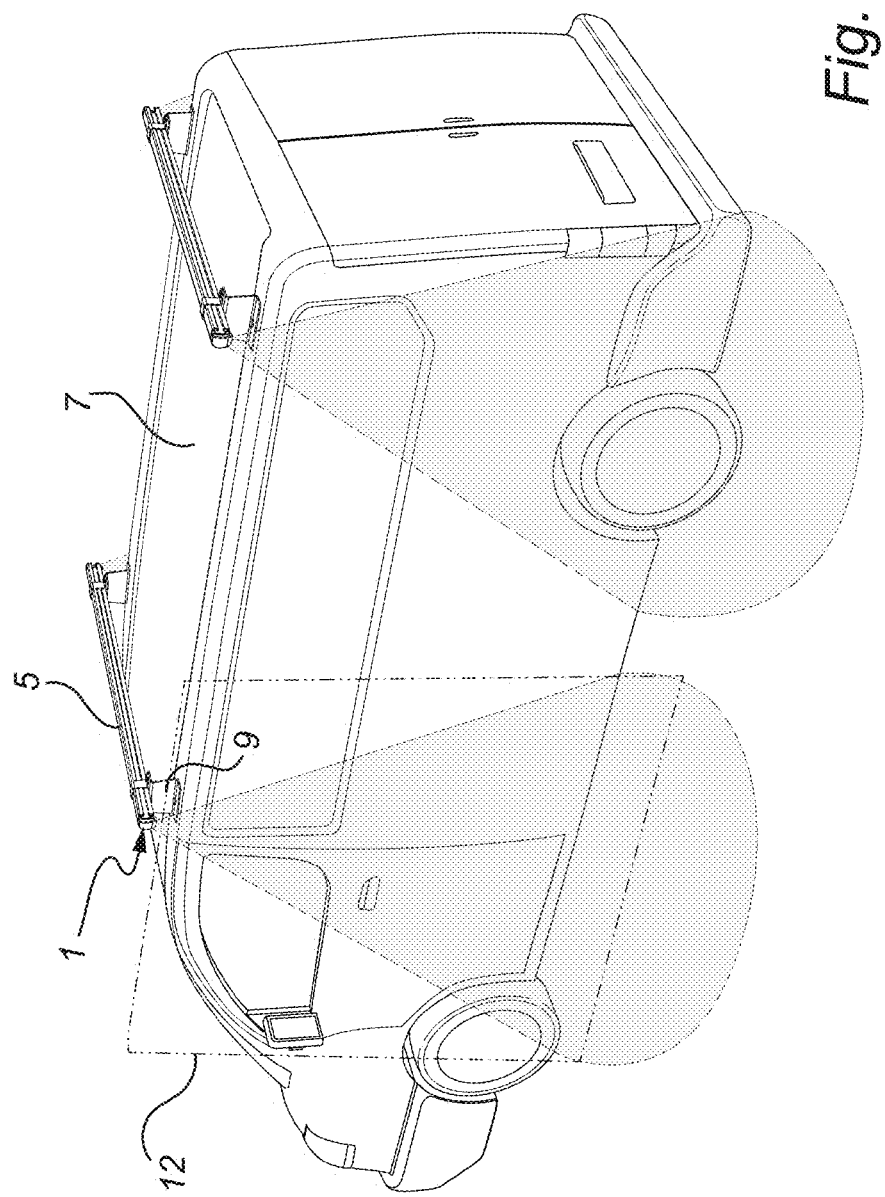
FIG. 2B is a perspective view of the same roof bar as shown in FIG. 2A. Here, the endcap is emitting light in a second plane, according to a second mode of lighting.

FIG. 2B shows a roof bar 5 comprising the endcap 1 when mounted on the roof 7 of a vehicle. Here, the endcap 1 is in a second mode of lighting and thus emitting light substantially in a second geometrical plane 12 deviating from the first geometrical plane 12 as shown in FIG. 2A. The second plane 12 is angled with respect to the roof 7 such that light is provided in close proximity to the vehicle, which is desirable when e.g. working close to the vehicle.

FIG. 3A shows an inverted endcap in relation to the endcap shown in FIG. 1-2B for clarifying purposes, i.e. an endcap adapted to be arranged on an opposite distal end. However, the following description is applicable to an endcap according to the present inventive concept regardless of which distal end it is adapted to be arranged on. FIG. 3A shows a disassembled endcap 1 comprising a light emitting device board 14. The board 14 comprises several light emitting devices 15. The light emitting device 15 is e.g. a LED-device. In FIG. 3A, a board 14 comprising nine light emitting devices 15 is shown, but an endcap 1 according to the present inventive concept is not limited to or restricted by a specific number of light emitting devices 15. The first and second modes of lighting as illustrated in FIG. 2A and FIG. 2B, respectively, of the endcap 1 may correspond to illumination by different combinations of light emitting devices 15. For example, the first mode of lighting as shown in FIG. 2A may correspond to illumination from a first row of light emitting devices 15 as seen in FIG. 3A. Alternatively, the first mode of lighting may correspond to illumination from a first and a second row of light emitting devices 15. Thus, the second mode of lighting as shown in FIG. 2B corresponds, in such examples, to illumination from a second and third row or alternatively just a third row of light emitting devices 15.

The board 14 may comprise the electronics needed to power, drive and control the light emitting devices 15, and therefore being entirely self sufficient in this regard. In the present figure, the board 14 comprises an external connector 16 adapted to receive an external connection device. The external connection device may in turn be comprised in the vehicle, in a rechargeable battery device or wireless communication device etc. The board 14 further comprises means 41 for receiving an external signal arranged to convert an external signal into a controller input signal. The means 41 for receiving an external signal is electrically and/or electronically connected to the external connector 16 so that the external signal may be conveyed and interfaced through the external connector. The board 14 may additionally and/or alternatively comprise means for receiving an external wireless signal. The board 14 further comprises a controller arranged to receive the controller input signal and convert the controller input signal into an electrical control signal for controlling the one or more light emitting devices 15.

The endcap 1 further comprises a fixation frame 17 adapted to be arranged around a circumference of the board 14 when the endcap 1 is assembled. The fixation frame 17 is arranged to fixate the position of the board 14 in the assembled endcap 1. The frame 17 comprises a protrusion 18 adapted to fit an indention 19 of the board 14 such that, when the endcap 1 is assembled, the protrusion 18 restricts movement of the board 14.

The endcap 1 further comprises a back portion 20. The back portion 20 is adapted to act as a support structure for the envelope 2, board 14 and fixation frame 17. The back portion 20 comprises an inner through-hole 21 adapted to be aligned with the external connector 16 when the endcap 1 is assembled. Thus, the inner through-hole 21, when the endcap 1 is assembled, acts as an opening to the connector 16 and permits reception of an external connection device by the connector 16. The back portion 20 further comprises a set of outer through-holes 22', 22", and 22'". The outer through-holes 22', 22" are adapted to align with a respective through-hole 23',23" of the protrusion 18 of the fixation frame 17, such that, when they are brought together, the frame 17 and the back portion 20 may be connected with and attached to each other by an attaching means. The back portion 20 further comprises a fixation pin 24 adapted to be received by a fixation hole 25 of the board 14 so that the board 14 is fixedly attached to the back portion 20 when the endcap 1 is assembled. The back portion further comprises a first and a second laterally projecting portion 26',26", each of the laterally projecting portions 26',26" comprising a respective through-hole 27',27" adapted to align with a respective through-hole 4',4" of the fastening portions 3',3" of the envelope 2 when the endcap is assembled.

Figure 3B:
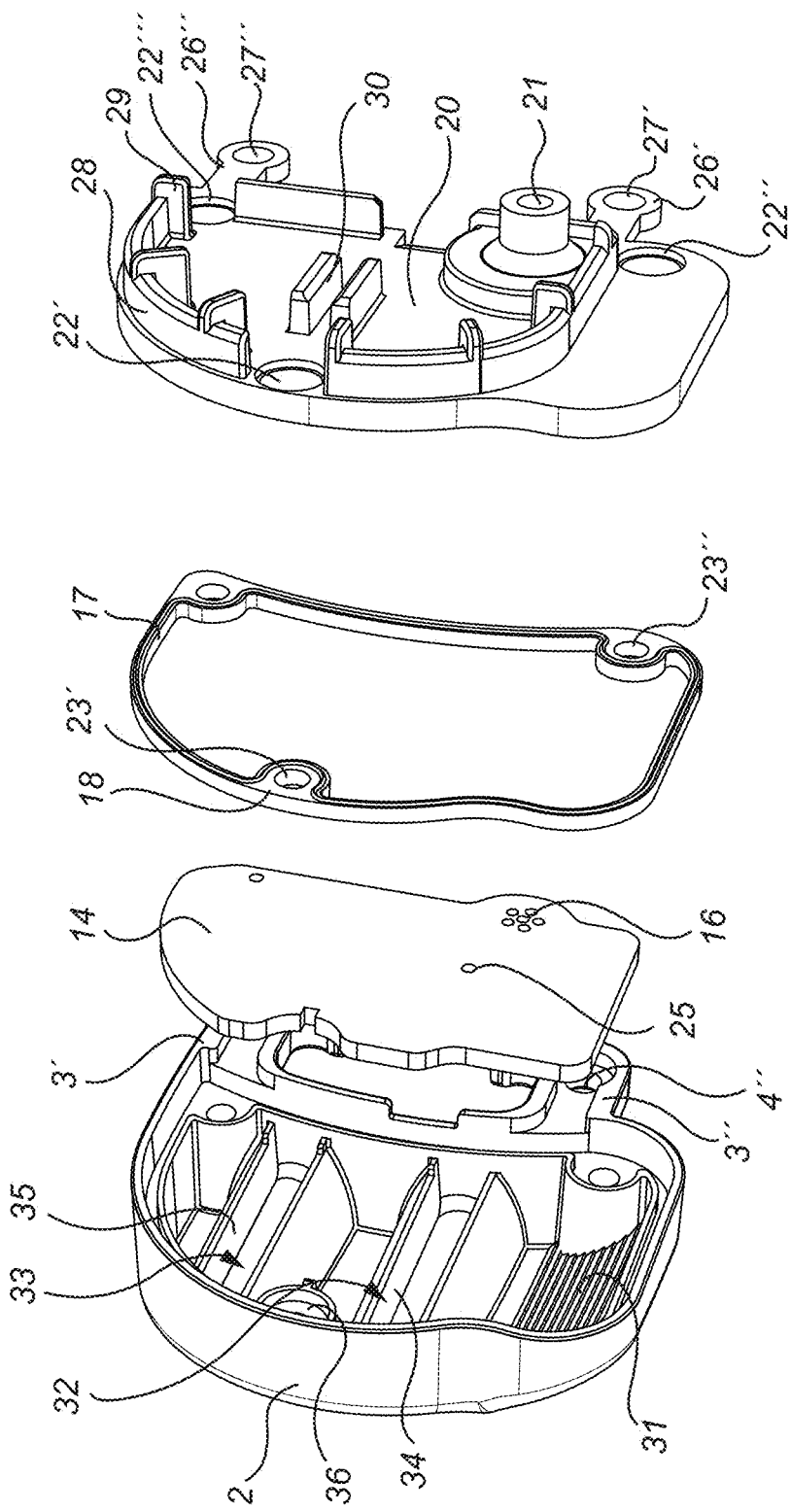
FIG. 3B is an exploded view of the endcap in FIG. 3A from a different perspective.

FIG. 3B shows the disassembled endcap 1 shown in FIG. 3A from another perspective. The back portion 20 comprises an engagement part 28 for engaging with a distal end of a roof bar 5. The engagement part 28 comprises prongs 29 adapted to engage with and connect to the distal end of the roof bar 5. The back portion 20 further comprises attachment prongs 30 for attaching to the roof bar 5, e.g. by snap-fitting to a receiving means of the roof bar 5.

The outer through-hole 22' and the through-hole 23' of the fixation part are further adapted to align with an attachment means receiving portion 36 of the envelope 2 such that an attachment means can be brought through both through-holes 22,' 23' and attach to the attachment means receiving portion 36 such that the parts 2, 14, 17, 20 of the endcap 1 is assembled and held together.

The envelope 2 comprises a transmissive grid 31 adapted to permit transmission of light emitted from one or more of the light emitting devices 15 of the board 14. The transmissive grid 31 is arranged such that light transmitted through it passes through the second light exit surface 2" of the envelope. The envelope 2 further comprises a first light slit 32 and a second light slit 33. The first light slit 32 and the second light slit 33 are both adapted to permit light transmission of light emitted from one or more of the light emitting devices 15 of the board 14. Furthermore, both slits 32, 33 comprises at least one inner surface 34, 35. Any one of the inner surfaces 34, 35 may be a reflective surface such that light entering the respective slit 32, 33 and that is incident to the surface 34, 35 is reflected. The angle of reflection is determined by an angle of the surface 34, 35 with respect to the light emitting device 15 from which the reflected light is emitted from. Thus, the angle of reflection can be chosen by varying the angle of the surface 34, 35 with respect to the light emitting device 15. By varying the angle of reflection, a more concentrated or a less concentrated light distribution can be achieved.

Figure 4:
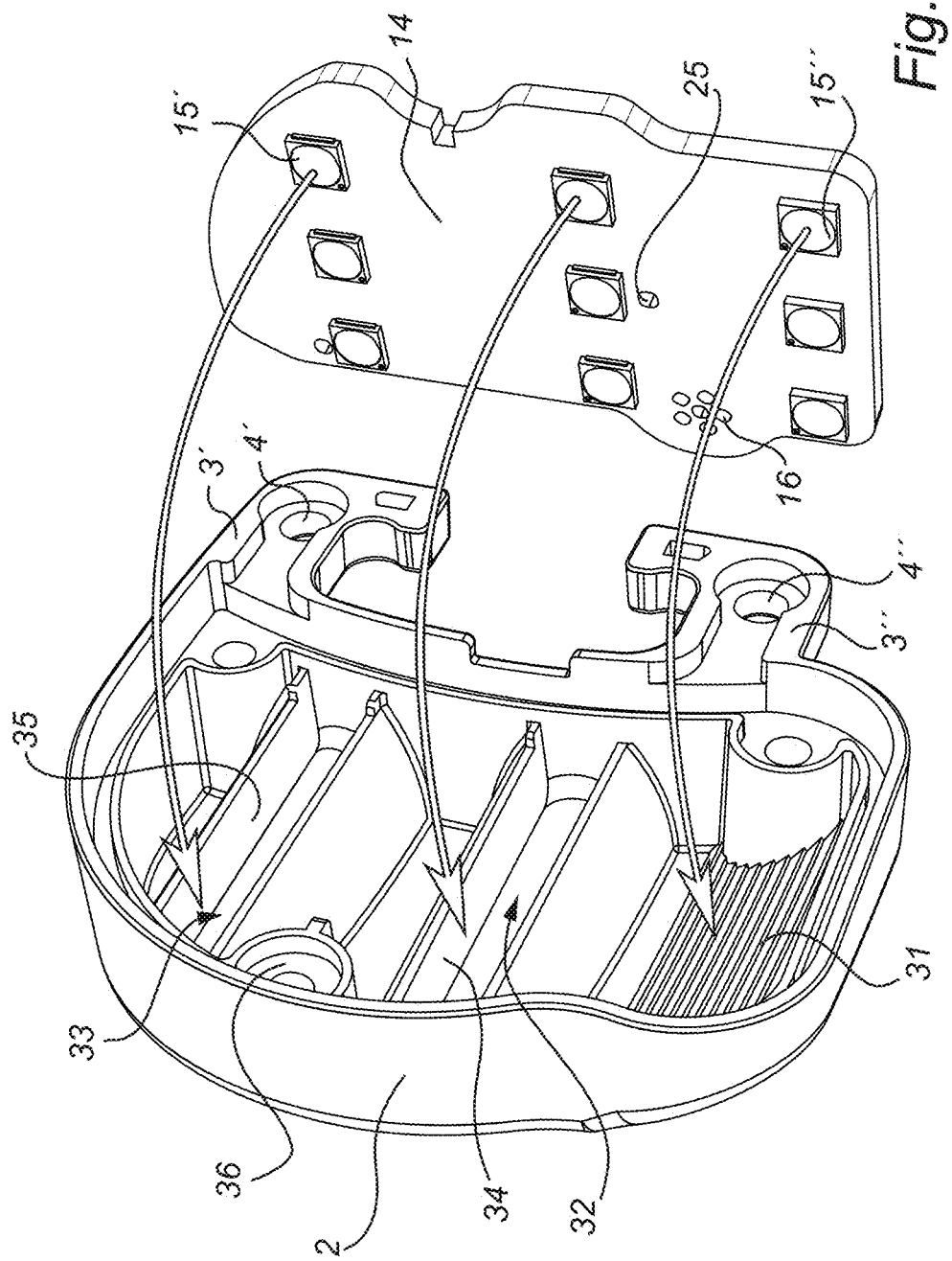
FIG. 4 is an exploded perspective view of a part of an endcap according to the present inventive concept.

FIG. 4 shows how the board 14 is to be arranged against the envelope 2. How the board 14 and the light emitting devices 15 are to be arranged against the envelope 2 is indicated by the white arrows. For example, the top right light emitting device 15' as seen in FIG. 4 is adapted to be arranged at least partially inside of, or proximal to, the second slit 33 whereas the bottom right light emitting device 15" is adapted to be arranged at least partially inside of, or proximal to, the transmissive grid 31. In this case, as an example, light emitted from the light emitting device 15' that is transmitted through the slit 33 and through the light emitting surface 2' corresponds to the first mode of lighting of the endcap 1. Moreover, light emitted from the light emitting device 15" that is transmitted through the transmissive grid 31 and through the light emitting surface 2" corresponds to the second mode of lighting of the endcap 1.

The person skilled in the art realizes that the present inventive concept by no means is limited to the embodiments described above. The features of the described embodiments may be combined in different ways, and many modifications and variations are possible within the scope of the appended claims. In the claims, any reference signs placed between parentheses shall not be construed as limiting the claim. The word "comprising" does not exclude the presence of other elements or steps than those listed in the claim. The word "a" or "an" preceding an element does not exclude the presence of a plurality of such elements.

What is claimed is:

1. A roof bar endcap for a vehicle, the endcap comprising:
at least two light emitting devices configured to emit light;
a light transmissive envelope arranged to cover the at least two light emitting devices, the light transmissive envelope including at least two light exit surface portions, wherein each of the at least two light exit surface portions is a portion of the light transmissive envelope, and one of the at least two light exit surface portions is configured to direct light emitted from one of the at least two light emitting devices through the light transmissive envelope in a different direction relative to light emitted from another of the at least two light emitting devices through another of the at least two light exit surface portions; and
an engagement part configured to engage a distal end of a roof bar such that the endcap is fixedly attached to the roof bar and to engage the light transmissive envelope, wherein
the at least two light emitting devices are disposed between the light transmissive envelope and the engagement part.

2. The endcap according to claim 1, further comprising:
a board in connection with the at least two light emitting devices and disposed between the light transmissive envelope and the engagement part, the board configured to control light emission from the at least two light emitting devices, and the board having a connector and a controller mounted thereon, wherein
the connector is configured to connect to a means for receiving an external signal and to transmit the external signal to the controller, and
the controller is configured to receive the external signal and to convert the external signal into an electrical control signal for controlling the at least two light emitting devices.

3. The endcap according to claim 1, further comprising an energy storage unit configured to provide power to the at least two light emitting devices.

4. The endcap according to claim 2, wherein the connector is further configured to electrically and mechanically connect to a power grid of the vehicle.

5. The endcap according to claim 2, wherein the external signal received by the connector and transmitted to the controller is an electrical signal originating from the vehicle.

6. The endcap according to claim 1, wherein the one of the at least two light emitting devices is configured to operate in a first lighting mode and the other of the at least two light emitting devices is configured to operate in a second lighting mode.

7. The endcap according to claim 6, wherein the one of the at least two light emitting devices operating in the first lighting mode is configured to emit light in a first plane, and the other of the at least two light emitting devices operating in the second lighting mode is configured to emit light in a second plane, the first plane being substantially orthogonal to the second plane.

8. The endcap according to claim 6, wherein the one of the at least two light exit surface portions is a first light exit surface portion and the other of the at least two light exit surface portions is a second light exit surface portion,
the one of the at least two light emitting devices operating in the first lighting mode is configured to emit light through the first light exit surface portion, and
the other of the at least two light emitting devices operating in the second lighting mode is configured to emit light through the second light exit surface portion.

9. The endcap according to claim 8, wherein the first light exit surface portion is arranged at an angle relative to the second light exit surface portion.

10. The endcap according to claim 9, wherein
the at least two light emitting devices include two light emitting devices, the two light emitting devices being a first light emitting device and a second light emitting device,
the first light emitting device is configured to operate in the first lighting mode to emit light through the first light exit surface portion, and
the second light emitting device is configured to operate in the second lighting mode to emit light through the second light exit surface portion.

11. A roof bar for a roof of the vehicle, the roof bar comprising at least one roof bar endcap according to claim 1.

12. A roof bar endcap for a vehicle having a roof bar, the roof bar having a longitudinal axis and extending longitudinally in a direction of the longitudinal axis, the roof bar having a first end with a first end face surface arranged to face in the direction of the longitudinal axis, a second end with a second end face surface arranged to face in the direction of the longitudinal axis, and a plurality of peripheral surfaces disposed between the first end face surface and the second end face surface, each of the first and second end face surfaces having a profile defined by an edge extending around a periphery of the respective first and second end face surfaces, the roof bar endcap comprising:
one or more light emitting devices configured to emit light;
a light transmissive envelope arranged to cover the one or more light emitting devices and configured to allow light emitted from the one or more light emitting devices to pass through the light transmissive envelope; and
an engagement part having a plurality of peripheral surfaces extending around a periphery of the engagement part and a face surface arranged to face in a direction of the longitudinal axis, the face surface of the engagement part configured to abut and directly engage either of the first end face surface of the roof bar or the second end face surface of the roof bar to fixedly attach the engagement part to the roof bar, the engagement part configured to engage the light transmissive envelope, and a profile of the engagement part defined by an edge extending around a periphery of the face surface, wherein
the one or more light emitting devices are disposed between the light transmissive envelope and the engagement part,
the profile of the engagement part is identical to the profile of the first end face surface and the profile of the second end face surface such that when the engagement part is engaged to either of the first end face surface or the second end face surface of the roof bar, the peripheral surfaces of the engagement part are flush with the peripheral surfaces of the roof bar.

\* \* \* \* \*